United States Patent
Cho et al.

(10) Patent No.: US 9,471,187 B2
(45) Date of Patent: Oct. 18, 2016

(54) INPUT DEVICE AND PORTABLE TERMINAL THEREWITH

(71) Applicant: Samsung Electronics Co., Ltd., Gyeonggi-do (KR)

(72) Inventors: Chi-Hyun Cho, Gyeonggi-do (KR); Chang-Ryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/324,007

(22) Filed: Jul. 3, 2014

(65) Prior Publication Data

US 2015/0009150 A1  Jan. 8, 2015

(30) Foreign Application Priority Data

Jul. 3, 2013  (KR) .................. 10-2013-0078094

(51) Int. Cl.
*G06F 3/02* (2006.01)
*G06F 3/044* (2006.01)
*G06F 3/041* (2006.01)
*G06F 3/046* (2006.01)

(52) U.S. Cl.
CPC ............. *G06F 3/044* (2013.01); *G06F 3/0202* (2013.01); *G06F 3/041* (2013.01); *G06F 3/046* (2013.01); *G06F 2203/04106* (2013.01)

(58) Field of Classification Search
USPC ......... 345/168, 173, 174, 158, 184; 327/517
See application file for complete search history.

(56) References Cited

U.S. PATENT DOCUMENTS

| | | | |
|---|---|---|---|
| 8,976,141 B2* | 3/2015 | Myers ................ | H04M 1/0268 345/173 |
| 2011/0001613 A1 | 1/2011 | Ciesla et al. | |
| 2012/0293455 A1* | 11/2012 | Shen ...................... | G06F 3/044 345/174 |
| 2012/0327006 A1* | 12/2012 | Israr et al. ................. | 345/173 |
| 2013/0016042 A1* | 1/2013 | Makinen .............. | G06F 3/016 345/168 |
| 2013/0050130 A1* | 2/2013 | Brown .................. | G06F 3/044 345/174 |
| 2014/0009441 A1* | 1/2014 | Bernstein et al. ........... | 345/174 |
| 2014/0035833 A1* | 2/2014 | Gorsica ................. | G06F 3/041 345/173 |
| 2014/0097885 A1* | 4/2014 | Hu ............................. | 327/517 |
| 2014/0132532 A1* | 5/2014 | Yairi et al. ................... | 345/173 |
| 2014/0253473 A1* | 9/2014 | Kim ....................... | G06F 3/044 345/173 |
| 2015/0160773 A1* | 6/2015 | Bernstein et al. .......... | 345/174 |
| 2015/0177886 A1* | 6/2015 | Gorsica ................. | G06F 3/041 345/174 |
| 2015/0227227 A1* | 8/2015 | Myers ................. | H04M 1/0268 345/173 |
| 2015/0234482 A1* | 8/2015 | Jobs ...................... | G06F 3/0362 345/184 |
| 2015/0242020 A1* | 8/2015 | Yairi ...................... | G06F 3/044 345/174 |
| 2016/0062529 A1* | 3/2016 | Jeng ...................... | G06F 3/041 345/173 |

* cited by examiner

*Primary Examiner* — Thuy Pardo

(57) ABSTRACT

An input device and a portable terminal. The input device includes a tactile member which varies at positions of input keys, and a contact sensing layer which is disposed under the tactile member so as to detect an input operation through the tactile member. Further, the portable terminal includes a body which has an input/output unit, an input device which is detachably connected to the body so as to implement an input to the body, and a controller which controls an operation of the input/output unit and the input device, wherein the input device further includes a tactile member which varies at a position of a contacted input key, and a contact sensing layer which is disposed under the tactile member so as to detect an input operation through the tactile member.

25 Claims, 11 Drawing Sheets

| MODE | | TACTILE MEMBER 210 | FIRST TOUCH PANEL 221 | SECOND TOUCH PANEL 222 | ELECTRONIC PAPER 240 |
|---|---|---|---|---|---|
| M2 | INPUT MEMBER MODE | PLANE STATE (DEACTIVATED) | DEACTIVATED | ACTIVATED | DEACTIVATED |
| M1 | KEYBOARD MODE | RAISED STATE (ACTIVATED) | ACTIVATED | DEACTIVATED | ACTIVATED |

FIG.11

INPUT DEVICE AND PORTABLE TERMINAL THEREWITH

CROSS-REFERENCE TO RELATED APPLICATION(S) AND CLAIM OF PRIORITY

The present application is related to and claims the priority under 35 U.S.C. §119(a) to Korean Application Serial No. 10-2013-0078094, which was filed in the Korean Intellectual Property Office on Jul. 3, 2013, the entire content of which is hereby incorporated by reference.

TECHNICAL FIELD

The present disclosure relates to an input device and a portable terminal therewith.

BACKGROUND

Generally, an electronic device, especially a portable terminal, means a device with which a user communicates with another user through a mobile communication base station while carrying it, or which provides a function to allow a user to access a service which is provided by a service vender. With the development of mobile communication technologies and an information and communication industry, a service field using a portable terminal has been rapidly expanded. For example, the early mobile communication services were limited to the calling of a counterpart, voice communication, short message transmission, etc. However, the services have been gradually expanded to multimedia services such as moving images, entertainment services such as games, banking services such as mobile banking, etc. and users of portable terminals have also gradually expanded from the youth to elderly people.

Recently, multimedia services provided through portable terminals have been strengthened, and portable terminals such as a smart phones or tablet PCs that come close to a conventional personal computer in function have been commercialized. Accordingly, an environment has been developed in which a person is capable of enjoying a moving image or the Internet and further conducting business using a smart phone or a tablet PC. In addition, as a display unit using a touch screen has been substituted for a keyboard constituted of physical switches as well as an output of a screen, it is capable of implementing an input simultaneously. Accordingly, although the portable terminal has been miniaturized, it can be provided with an expanded display unit.

On the other hand, with relation to the expansion of functions, various additional devices are utilized. For example, there are provided devices including an additional device with a simple structure such as a cradle providing a user with a convenience when a battery pack is charged in a state that the portable terminal is cradled, or when a user uses a multimedia function, and a docking station on which a portable terminal is mounted and which may be connected to an external audio or image device. In the case where an audio device is docked with the portable terminal, the audio device can reproduce files stored in a storage medium such as a compact disk (CD). A user can freely store desired files in the portable terminal compared with a storage medium for a general audio device. Therefore, if the user has a docking station equipped with a function of an audio device, it is possible to utilize various and abundant multimedia contents using the portable terminal.

Further, another additional device includes an input device which is separately provided to the portable terminal, particularly an input device which expands and is added to a keyboard. In the case of a smart phone or a tablet PC, it has a performance equal to or proximate to that of a home or office computer. Accordingly, it is possible to perform a simply task or web-surfing with the smart phone or the tablet PC. Furthermore, the smart phone or the tablet PC has an excellent mobility in comparison with a lap-top computer. In the case of such a smart phone or a tablet PC, a separate input device connectable to a portable terminal is implemented, thereby enhancing a convenience of a user. That is, if the user wants, he/she can substantially utilize the portable terminal, such as a tablet PC, like a lap-top computer through the input device anywhere.

When the portable terminal is coupled with the separate input device, the portable terminal is cradled on the input device at a desired angle. Accordingly, an input can be achieved through the input device. However, since the portable terminal is cradled, it is difficult to implement an input on a touch screen with an input member such as a stylus pen or an electronic pen. That is, because the touch screen has an unsuitable input angle to a hand grasping the electronic pen, there is an inconvenience in that the portable terminal is separated from the input device and put on a floor when an input is implemented with an electronic pen.

Moreover, in order to cradle the portable terminal, the input device has to be adjusted to balance of weight of the portable terminal. Therefore, since the input device has to include a metal material or a material with a constant weight, an unnecessary material as well as a material required to implement the input is provided and it causes to increase a material cost unnecessarily.

SUMMARY

To address the above-discussed deficiencies, it is a primary object to provide an input device and a portable terminal therewith, which can implement an input using an input member such as an electronic pen as well as input keys.

In accordance with an aspect of the present disclosure, an input device is provided. The input device includes: a tactile member which varies at positions of input keys; and a contact sensing layer which is provided at a lower portion of the tactile member, so as to detect an input operation through the tactile member.

In accordance with another aspect of the present disclosure, a portable terminal is provided. The portable terminal includes: a body which has an input/output unit; an input unit which is detachably connected to the body and implements an input to the body; and a controller which controls an operation of the input/output unit and the input device, wherein the input device includes: a tactile member which varies at positions of contacted input keys; and a contact sensing layer which is provided at a lower portion of the tactile member, so as to detect an input operation through the tactile member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an operation state of a tactile member, a contact sensing layer and an electronic paper according to an input mode of the input device in the device shown in FIG. 1.

DETAILED DESCRIPTION

Figure 1:
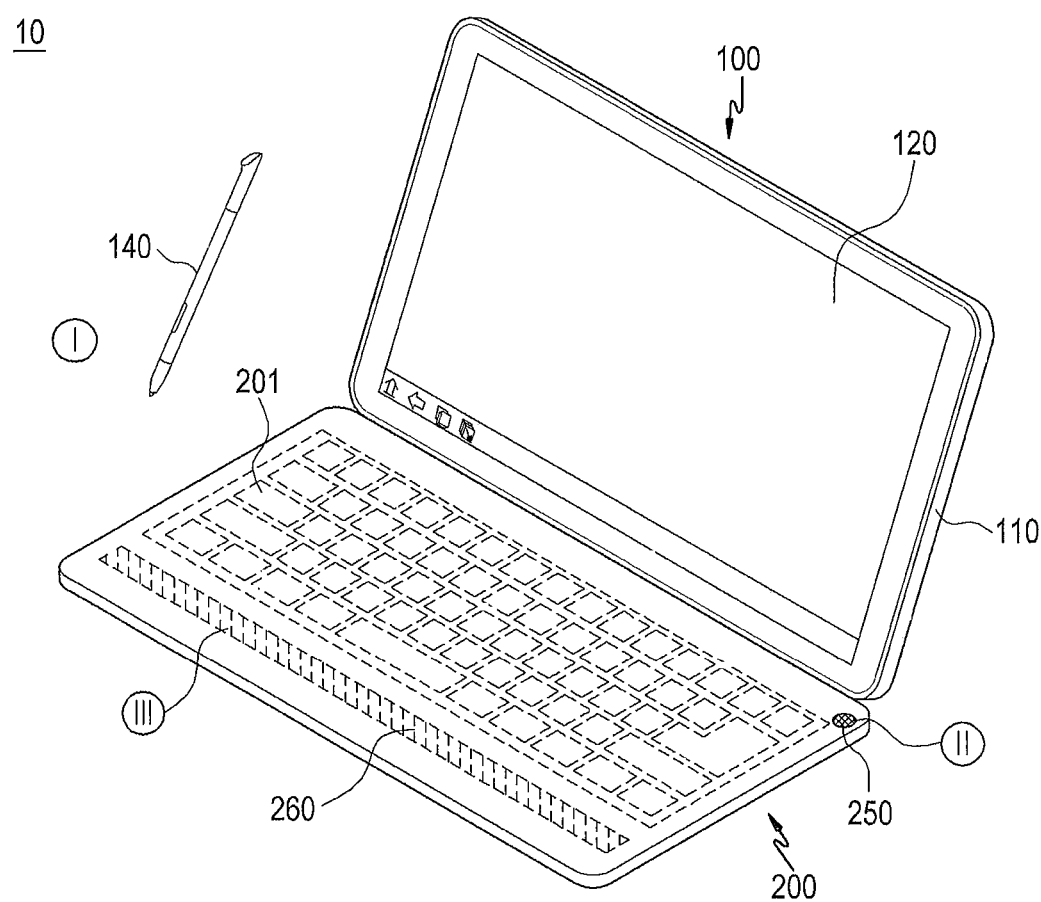
FIG. 1 illustrates a state in which a portable terminal is cradled on an input device according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. In the description, a thickness of lines or a size of structural elements in the drawings may be exaggeratedly shown for a convenience and definition of description. Further, terms to be described later are defined in consideration of functions in various embodiments of the present disclosure, and may be changed according to a user, an intention of an operator, or a convention. Therefore, the definitions of the terms should be determined based on contents throughout the specification.

Furthermore, in the description of the embodiments of the present disclosure, ordinal numbers such as first and second are used, but are to merely distinguish objects having the same name from one another. Orders thereof may be arbitrarily determined and the description of a preceding object will be applied to a following object. In the description of the embodiments of the present disclosure, in addition, the terms are used to describe the respective embodiments, and are not intended to limit the embodiments. A singular expression may include a plural expression unless they are definitely different in a context. In the description, it should be understood that the terms "include" or "have" indicate existence of a feature, a number, a step, an operation, a structural element, parts, or a combination thereof, and do not previously exclude the existence or probability of addition of one or more other features, numbers, steps, operations, structural elements, parts, or combinations thereof.

FIG. 1 illustrates a state in which a portable terminal is cradled on an input device according to an embodiment of the present disclosure. Referring to FIG. 1, a device 10 according to one of various embodiments of the present disclosure includes a portable terminal 100, and an input device 200 for implementing an input in the portable device 100.

Figure 2:
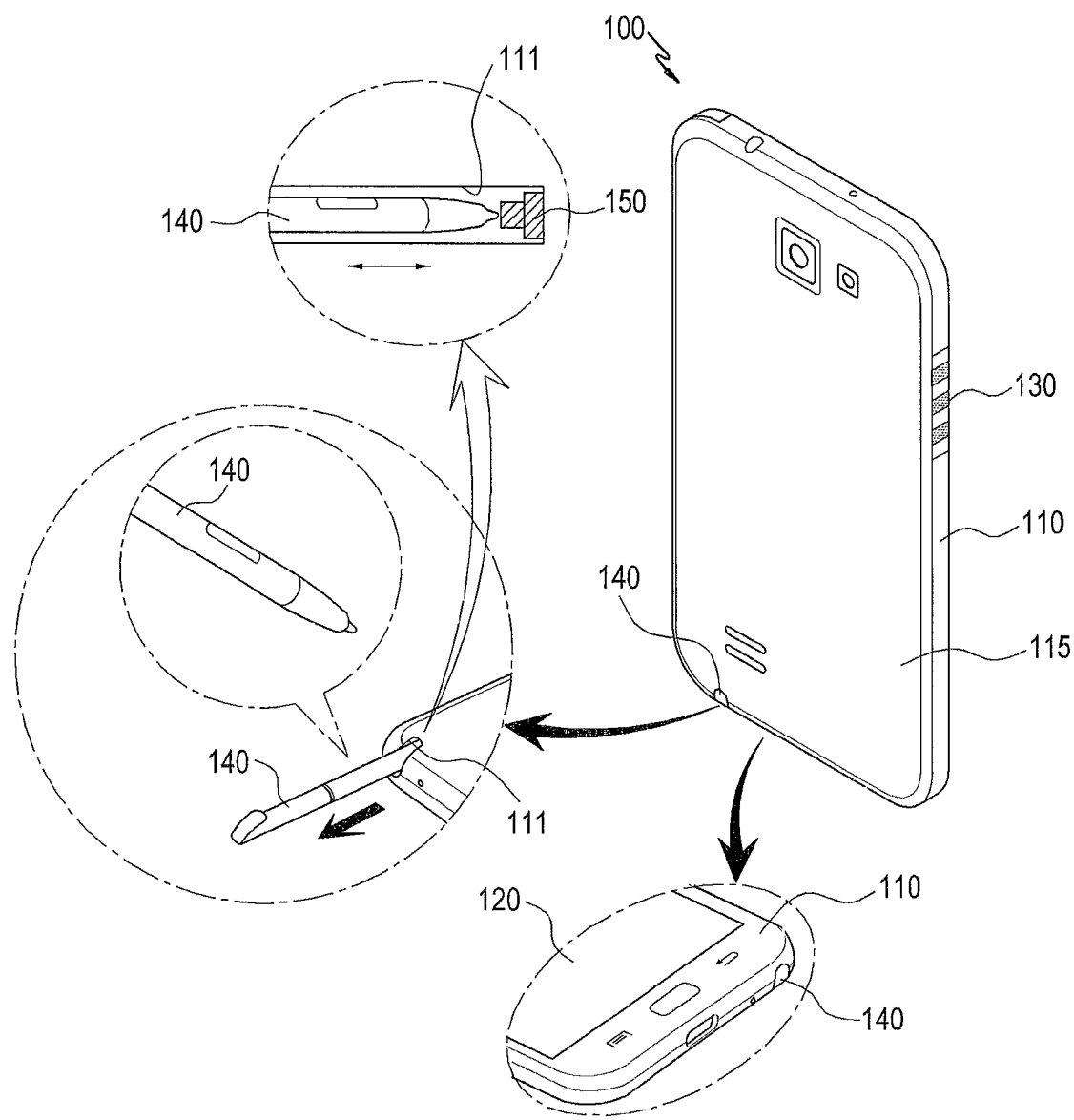
FIG. 2 illustrates a detailed view a portable terminal of a device shown in FIG. 1.
Figure 3:
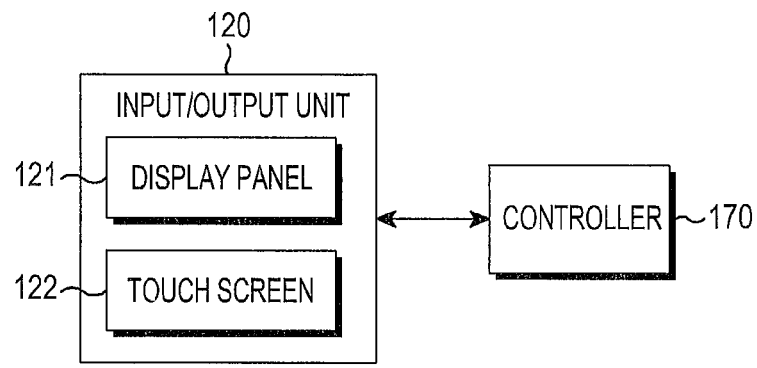
FIG. 3 is a block diagram illustrating a structure of an input/output unit of the portable terminal shown in FIG. 2.

FIG. 2 illustrates illustrating the portable terminal of the device shown in FIG. 1, and FIG. 3 is a block diagram illustrating a structure of an input/output unit of the portable terminal shown in FIG. 2. Referring to FIGS. 2 and 3, the portable terminal 100 includes a body 110 which is provided with various modules such as a communication module, a multimedia module, a camera module, an acoustic module, a sensor module, and the like. The portable terminal 100 of the present disclosure refers to a tablet PC or a portable electronic device 10. In an embodiment of the present disclosure, the portable terminal 100 includes a bar shaped body 110, an input/output unit 120 which has a large size and is arranged on a front surface of the body 110, an input member 140 for executing an input caused by a contact with the input/output unit 120 (the input member 140 will be described later, and may be provided to an input device 200 or be separately provided), a sensor module (not shown), and a controller 170 for controlling them. The portable terminal 100 further includes camera modules mounted on front and rear surfaces of the body 110, a button module for controlling an electric power supply, a sound volume and special functions, a connecting module for allowing the portable terminal to be connected to an external device, and a signal transmission and reception module (the above listed modules are not shown).

As described above, the body 110 includes the input/output unit 120, the input member 140, a module for performing various multimedia functions, a sensor module, and the controller 170. The input/output unit 120 is provided on the front surface of the body 110, and receives an input corresponding to a contact or proximity of an object so as to implement an output on a screen. That is, the input/output unit 120 refers to a device 10 capable of displaying an input or an output according to the input, and includes a display panel 121 and a touch screen 122.

The display panel 121 includes a Liquid Crystal Display (LCD) panel, and an Active Matrix Organic Light Emitting Diodes (AMOLED) panel, and displays various images corresponding to various operation states, execution of an applications, and services. The touch screen 122 is provided to detect a contact of the input member 140 such as a hand or an electronic pen described later. For example, the touch screen may include one or more touch screens 122 which are an electrostatic capacitive type, an electromagnetic resonance type, a resistant film type, or an acoustic wave type.

The body 110 may include a connecting device 130 at a side, which is connected to the input device 200. In the present disclosure, the body 110 is provided with a connecting unit 130 such as a pogo pin and a connecting terminal at a side thereof, and is electrically connected to an input device while being cradled on the input device 200. However, the connection of the portable terminal 100 to the input device 200 is not limited to the description. For example, the body 110 may be wirelessly connected to the input device 200 through a wireless communication module (not shown) such as a Bluetooth communication module (not shown), and also may be cradled on and electrically connected to the input device 200 through a hinge unit (not shown). As described above, a structure for the connection of the portable terminal 100 to the input device 200 while the portable terminal 100 is cradled on the input device 200 may be variously modified.

When the portable terminal 100 is cradled on and connected to the input device 200 at a side thereof, the controller 170 controls an implementation of an input into the portable terminal 100 through the input device 200. That is, a detailed input mode will be described later, but in the case that the input device 200 is implemented in a keyboard mode M1, a user contacts various input keys 201 protruding on the input device 200, so as to perform inputs into the portable terminal 100. In the case that the input device 200 is implemented in an input member mode M2, a user makes the input member come in contact with or close to the flat input device 200, so as to perform various inputs into the portable terminal 100.

In other words, the input member 140 contacts with the separate input device 200 instead of the touch screen 122, so as to implement the input identical to that caused by a contact of the input member 140 with the touch screen 122.

Figure 4:
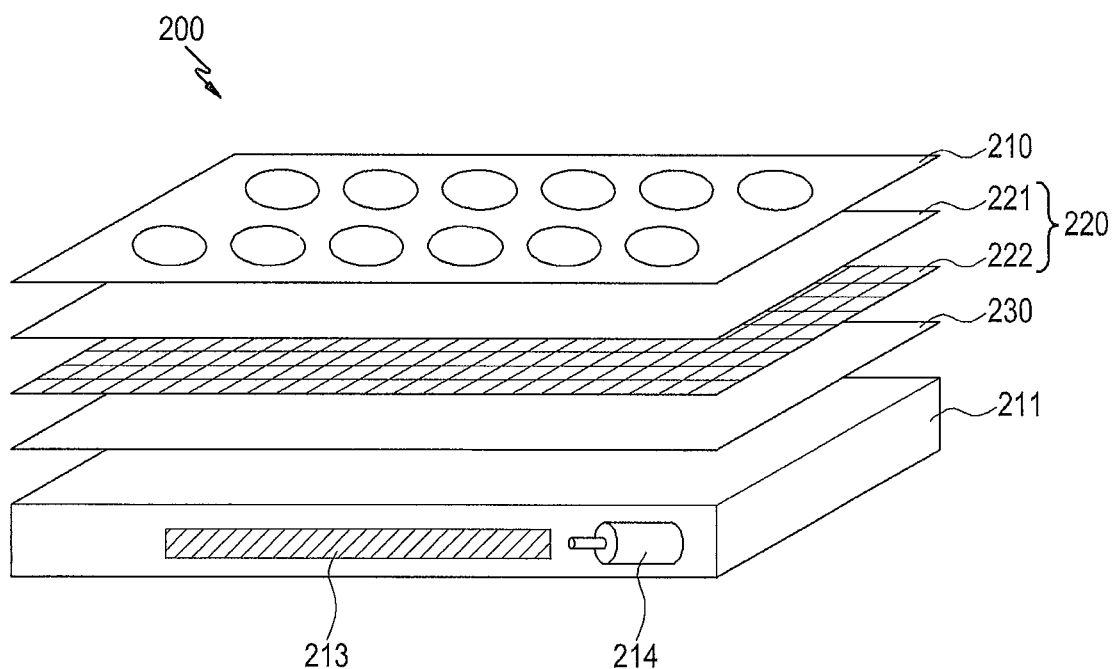
FIG. 4 illustrates the input device of the device shown in FIG. 1 according to an embodiment of the present disclosure.

FIG. 4 illustrates the input device of the device shown in FIG. 1 according to an embodiment of the present disclosure. Referring to FIG. 4, the input device 200 according to an embodiment of the present disclosure is configured to cradle the portable terminal 100 thereon. The input device 200 allows an input to be received in the portable terminal 100 through input keys 201 and also allows an input to be received in the portable terminal 100 through the input member 140 such as an electronic pen. To do this, the input device 200 of the present disclosure includes a tactile member 210, a contact sensing layer 220, and a display layer 230. The tactile member 210 is configured to be variable at positions of the input keys, and the contact sensing layer 220 is configured to detect an input operation through the tactile member 210.

Figure 5:
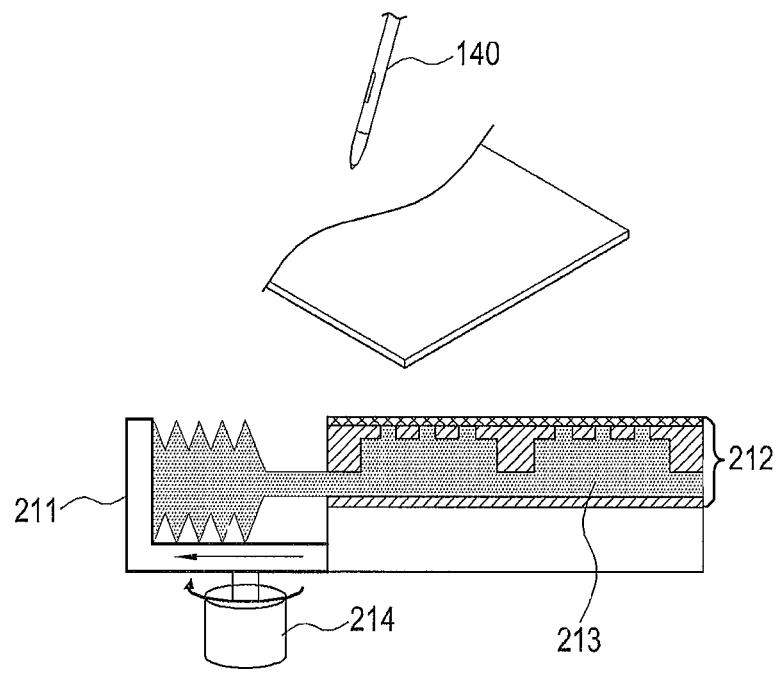
FIG. 5 illustrates a driving unit of the input device shown in FIG. 4, in which a tactile plate is in a flat state.
Figure 6:
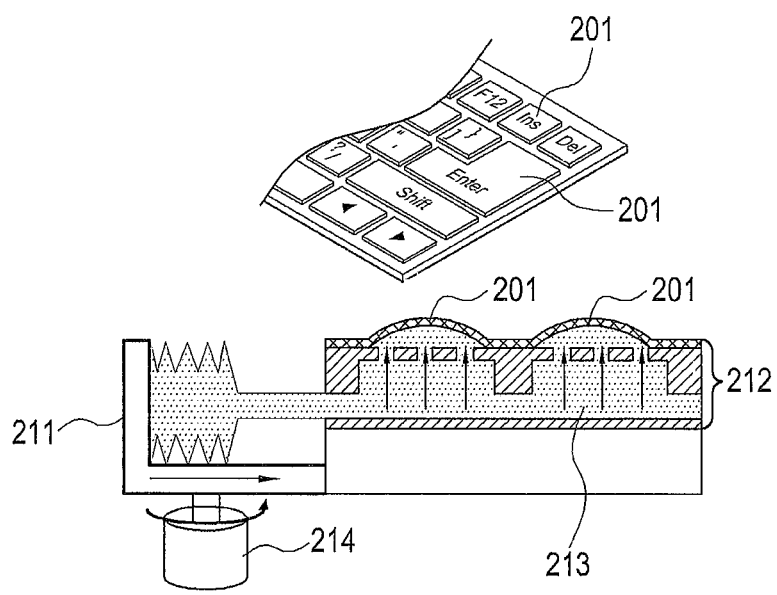
FIG. 6 illustrates an operation unit of the input device shown in FIG. 4, in which a tactile plate is in a raised state.
Figure 7:
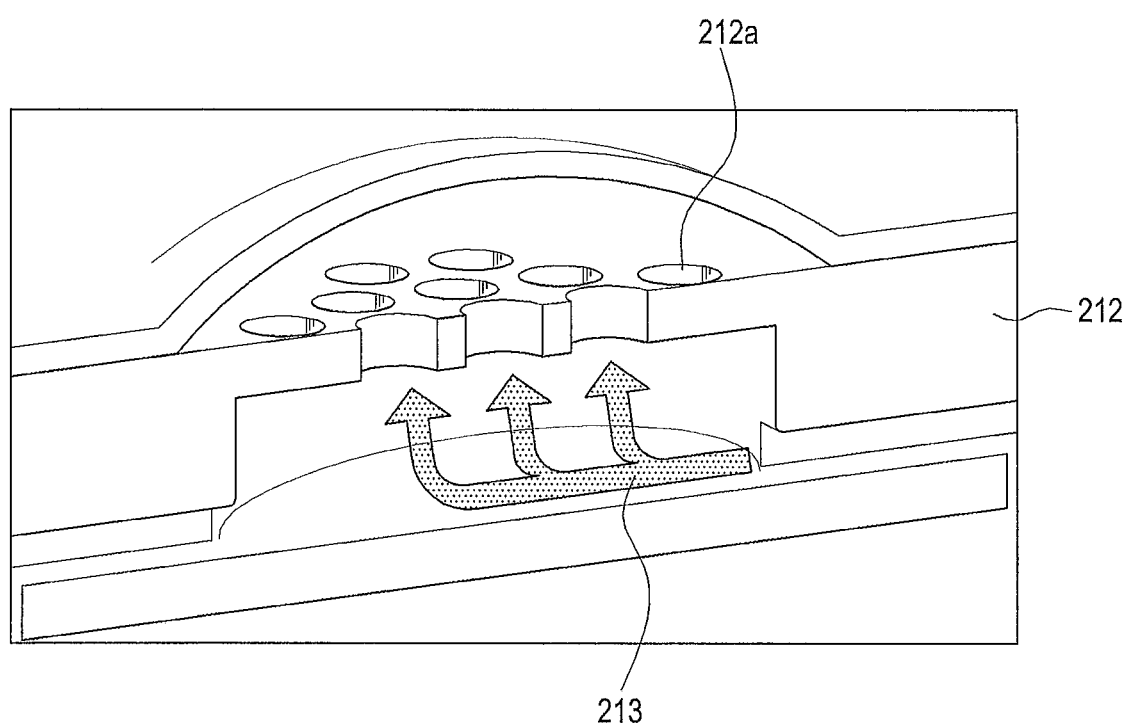
FIG. 7 illustrates an enlarged view of the tactile plate shown in FIG. 6.

FIG. 5 illustrates an operation unit of the input device shown in FIG. 4, in which a tactile plate is in a flat state, and FIG. 6 is a view illustrating an operation unit of the input device shown in FIG. 4, in which the tactile plate is in a risen state. FIG. 7 is an enlarged view illustrating the tactile plate shown in FIG. 6. Referring to FIGS. 5 to 7, the tactile member 210 includes the tactile plate 212 and the operation unit 250. The tactile plate 212 is provided on an upper side of the input device 200, particularly on an upper side of the contact sensing layer 220, and is maintained in the flat state or the raised state in that portions corresponding to the input keys 201 are raised, according to whether an operation unit 250 described later operates.

The tactile plate 212 may be made from a high molecular compound so as to be raised to positions of the input keys 201 from the flat state. The tactile plate 212 is provided with a plate having a plurality of fine holes 212a corresponding to positions of the input keys 201, through holes 212a which fluid 213 or gas makes the input keys 201 to be raised. Further, the tactile plate 212 is made of a transparent material, and allows a user to visibly identify the display layer 230 described later.

The operation unit 250 is provided under the contact sensing layer 220, and includes a housing 211, the fluid 213 (e.g., a liquid or gas) and an operation member 214. The housing 211 is provided with the fluid 213, particularly a micro-fluid, and the operation member 214, particularly a micro motor. According to the operation of the operation member 214, particularly the micro motor, the micro-fluid 213 moves toward the tactile plate 212. As a result, the input keys 201 are raised and deformed by fluid pressure of the micro-fluid.

Further, the housing 211 may cradle the portable terminal 100 thereon, and is formed with a cradle groove 270 (see FIGS. 9A and 9B) in which a connection terminal and the like are arranged in order to electrically connect the housing 211 to the portable terminal 100. In the present disclosure, although it is described that the housing 211 is formed with the cradle groove 270 (see FIGS. 9A and 9B) and the portable terminal 100 is cradled on and connected to the housing 211, the present disclosure is not limited thereto. Although described above, if the housing 211 is configured so that the portable terminal 100 is cradled on and connected to the input device 200, the shape or the structure of the housing 211 can be modified without limit.

Figure 8:
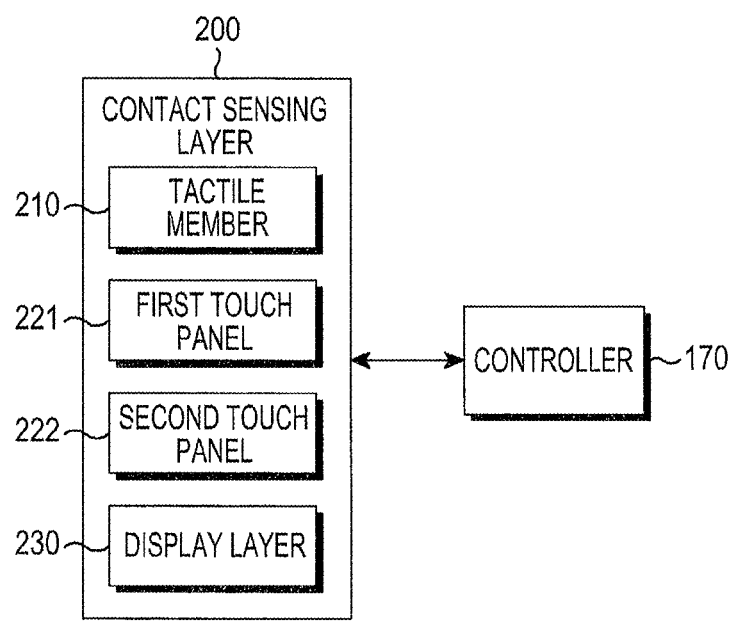
FIG. 8 is a block diagram illustrating a contact sensing layer in the input device shown in FIG. 4, according to an embodiment of the present disclosure.

FIG. 8 is a block diagram illustrating a contact sensing layer in the input device shown in FIG. 4, according to an embodiment of the present disclosure. Referring to FIG. 8, the contact sensing layer 220 includes at least two touch panels, i.e. a touch panel (corresponding to a first touch panel 221 described later) capable of detecting a generation of an electric charge according to a contact with a hand, and a touch panel (corresponding to a second touch panel 222 described later) capable of detecting a contact with the separate input member 140 such as an electronic pen.

In an embodiment of the present disclosure, the contact sensing layer 220 includes a first touch panel 221 of the electrostatic capacitive type, and a second touch panel 222 of an Electro-Magnetic Resonance type. The first touch panel 221 is the electrostatic capacitive type touch panel, and is disposed under a lower surface of the display panel 121. The first touch panel 221 according to an embodiment of the present disclosure is a panel such as Indium Tin Oxide (ITO) panel in which a thin metal conductive substance, i.e. ITO, is coated on both surfaces of a sheet glass so that electric current is applied on the surface of the sheet glass, and a dielectric capable of storing an electric charge is coated on the sheet glass. In the first touch panel 221, when an object touches the first touch panel, a predetermined amount of electric charges are moved to a touch position of the first touch panel 221 by means of static electricity. The first touch panel 221 recognizes the change of the electric current depending on the movement of the electric charges, so as to detect the touch position. The first touch panel 221 is capable of detecting all touches which may cause static electricity. Accordingly, the first touch panel 221 detects a contact with a user's hand, or the input member 140 such as the stylus pen. Further, the first touch panel 221 is activated in the keyboard mode M1 described later. Therefore, when the input device 200 is set to the keyboard mode M1, the first touch panel 221 is activated.

The second touch panel 222 is disposed under a lower surface of the first touch panel, and is a touch panel which is associated with the input member 140 described later to detect a contact of the input member 140. The second touch panel 222 is an Electro Magnetic Resonance (EMI) type touch panel, and includes an electromagnetic induction coil sensor (not shown) having a grid structure in which a plurality of loop coils are arranged in a first direction and a second direction intersecting with the first direction, and an electromagnetic signal processor (not shown) for sequentially providing alternate current signals, which have a predetermined frequency, to each loop coil of the electromagnetic induction coil sensor. The second touch panel 222 is provided with a separate input member 140 in which a resonance circuit capable of generating electric current based on electromagnetic induction is embedded. That is, when the input member 140 with the resonance circuit embedded is located near the corresponding loop coil, a magnetic field transmitted from the corresponding loop coil generates electric current in the resonance circuit of the input member 140, based on mutual electromagnetic induction. Based on the electric current, a coil constituting the resonance circuit in the input member 140 generates an induction magnetic field, and the second touch panel 222 detects the induction magnetic field through the loop coil which is in a signal receiving state, so as to sense a proximity position or a touch position of the input member 140. The second touch panel 222 is activated in an input member mode M2 described later. That is, the second touch panel 222 is configured to be activated in order to implement an input through the input member 140. When the input device 200 is set to the input member mode M2, the second touch panel 222 is activated.

The input member 140 (see FIGS. 1 and 2) according to an embodiment of the present disclosure is detachably provided to the body 110 for convenience. The input member 140 according to an embodiment of the present disclosure is a module such as an electronic pen. Accordingly, an electronic pen which is provided to a mounting portion 111 in the body 110 of the portable terminal 100 will be described as an example of the input member 140. Further, the input member 140 may be detachably provided to the input device 200 instead of the body 110. That is, the input member 140 may be provided to the input device 200, or may be independently provided separately from the portable terminal 100 and the input device 200. Furthermore, in the case that the input device 140 is independently provided separately from the portable terminal 100 or the input device 200, a separate module may be provided in order to detect whether the input member 140 is used. Although it is not shown, use of the input member 140 is detected by the module in the same manner that use of the input member 140 may be set through a certain application, so that the input device 200 is allowed to be converted into the input mode, particularly the keyboard mode M1 or the input member mode M2.

According to an embodiment of the present disclosure, the input member 140 is detachably disposed in the mounting portion 111 of the body 110 of the portable terminal 100. In addition, a sensing unit 150 for detecting a detachment and an attachment of the input member 140 may be provided in the mounting portion 111. The sensing unit 150 may be modified without limit if the sensing unit 150 detects the attachment and detachment of the input member 140, like a sensor or an on/off switch. The on/off switch will be described as an example of the sensing unit 150 in an embodiment of the present disclosure. Accordingly, when the input member 140 is inserted into the mounting portion 111, the switch is pushed and turned on so as for the input member 140 to be set to the state that input member 140 is provided in the mounting portion 111. When the input member 140 departs from the mounting portion 111, the switch is turned off so as for the input member 140 to be set to the state that input member 140 departs from the mounting portion 111. Further, the controller 170 controls to convert the input mode of the input device 200 depending on the attachment or detachment of the input member 140 detected by the detection unit 150.

The display layer 230 is provided under the contact detecting layer 220, and displays key values corresponding to the input keys 201 to a user when the input keys 201 are raised according to the operation of the tactile member 210. That is, when the tactile member 210 operates, the display layer 230 is also activated and displays the key values corresponding to the input keys 201. An electronic paper will be described as an example of the display layer 230 of the present disclosure. However, the display layer 230 is not limited to the electronic paper, and a structure or material of the display layer may be modified without limit as long as the display layer has the structure in that the key values are displayed on the positions of the input keys 201, like an LCD display and the like. Further, the display layer 230 is preferably activated only in the keyboard mode M1 because of being displayed in only the keyboard mode M1 described later.

Figure 9A:
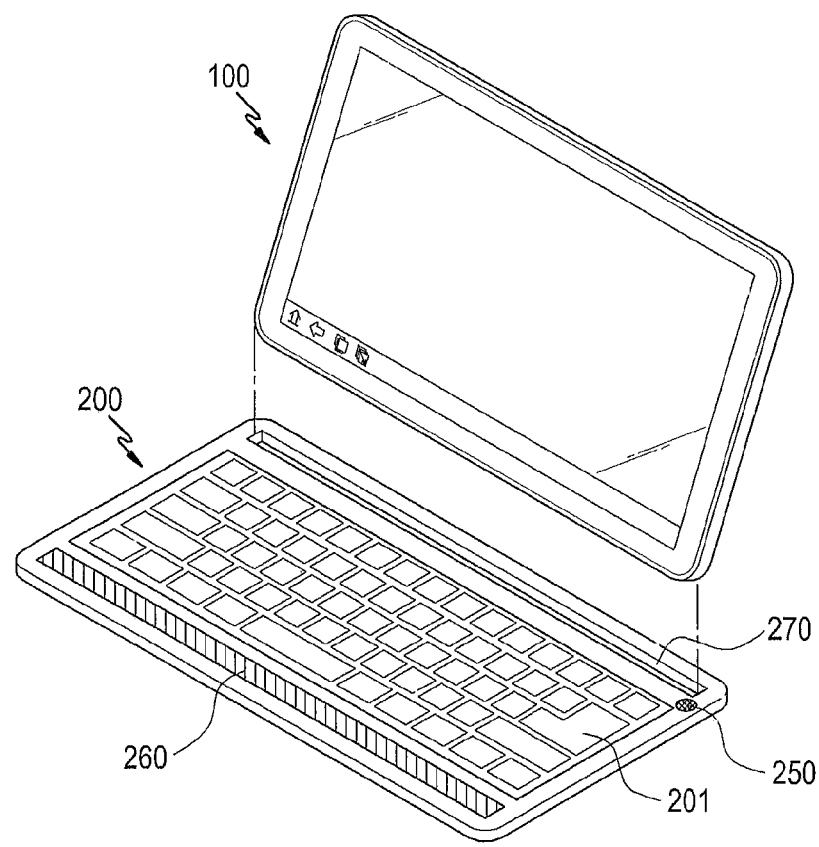
FIGS. 9A and B illustrate states in which the portable terminal is forwardly or reversely cradled on the input device in the device shown in FIG. 1.
Figure 9B:
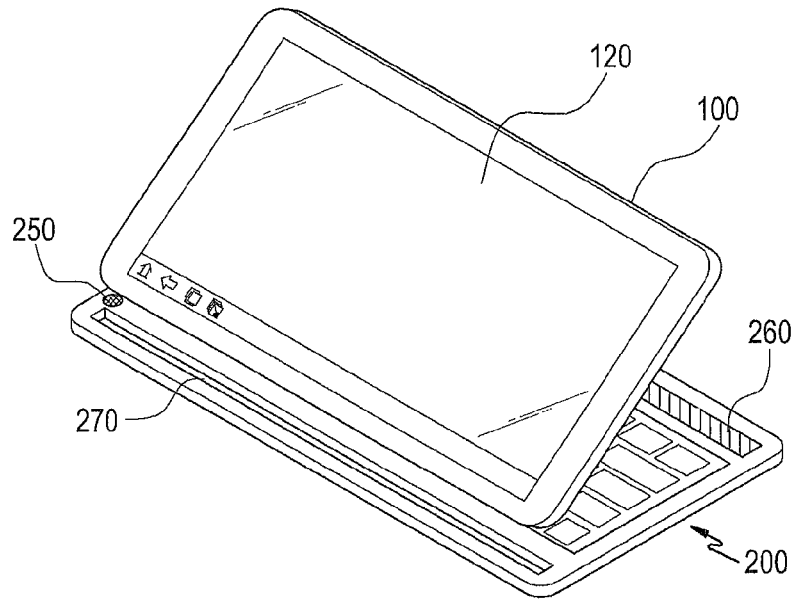

FIGS. 9A and 9B are views illustrating states in which the portable terminal is forwardly or reversely cradled on the input device in the device shown in FIG. 1. Referring to FIGS. 9A and 9B, the above described input device 200 may cradle the portable terminal 100 thereon forwardly or reversely. When the portable terminal 100 is forwardly cradled on the input device 200 (see FIG. 9A), a user implements an input through the input device 200. That is, when an input is executed by using the input device 200 in the keyboard mode M1 or the input member mode M2, an output according to the input of the input device 200 is displayed on a display panel of the body 110.

On the other hand, when the portable terminal 100 is reversely cradled on and connected to the input device 200 (see FIG. 9B), the portable terminal 100 is simply cradled or is used to utilize a multimedia function such as watching a video or to give a presentation to a companion. In the above mentioned examples, in the case that the portable terminal 100 is cradled on the input device 200 in order to utilize the multimedia function or to simply cradle the portable terminal, an operation of the input device 200 is unnecessary. Accordingly, it is preferred that the input device 200 is controlled to be deactivated while the input/output unit 120 is controlled to be activated. The control can be executed through a user setting using a specific application.

On the other hand, in the case that the portable terminal 100 is reversely cradled on the input device 200, the input device 200 is controlled to be activated through an execution of a specific application and the like, and the input/output unit 120, particularly the touch screen 122, is controlled to be deactivated.

Figure 10:
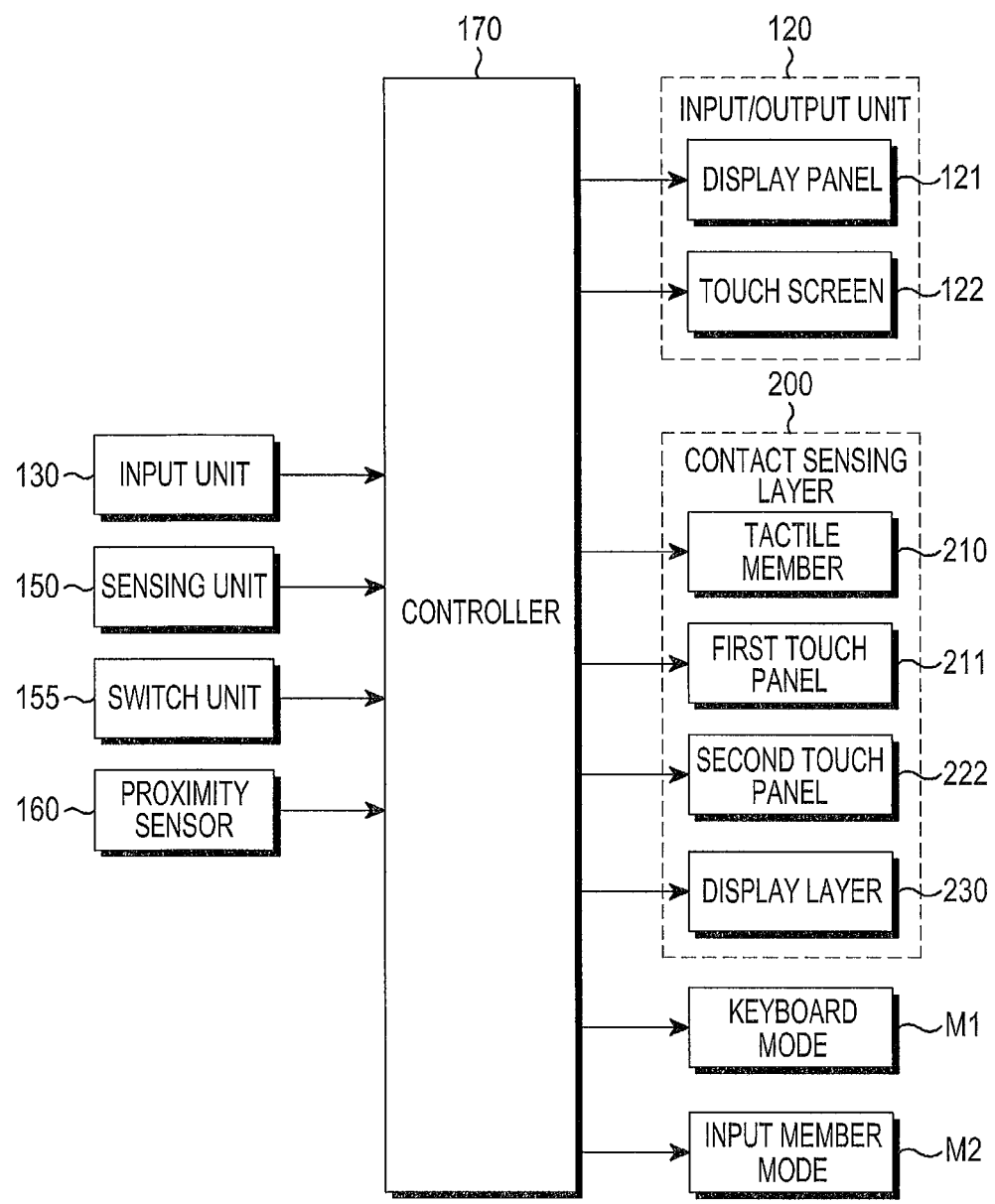
FIG. 10 is a block diagram illustrating a state in which the device is controlled according to a structure of the input device and the portable terminal of the device shown in FIG. 1.

FIG. 10 is a block diagram illustrating a state in which the device is controlled according to a structure of the input device and the portable terminal of the device shown in FIG.

1. Referring to FIG. 10, the controller 170 controls an operation of the input device 200, an operation of the input/output unit 120 and the like according to the detachment or attachment of the input device 200. When the portable terminal 100 is connected to the input device 200, the controller 170 controls an input mode of the input device 200. The implementation of the input is controlled according to whether the input device 200 is mounted. For example, if the portable device 100 is not connected to the input device 200, the controller 170 controls to implement an input and output through the input/output unit 120 of the body 110. Further, when the portable terminal 100 is connected to the input device 200, the controller 170 controls to turn on only the above described display panel 121 and to turn off the touch screen 122. Accordingly, it is controlled to implement an input through the input/output unit 120, particularly the touch screen 122. Further, the contact detecting layer 220 of the input device 200 is controlled to operate. In the case of controlling the operation of the contact detecting layer 220, the structural elements to be controlled may be changed according to the input mode of the input device 200.

That is, according to the setting for the input device 200, for example the detachment or attachment of the input member 140 described above, the on/off state of the switch unit 250, or the detection of the proximity sensor 260 and the sensing unit 150, the components of the contact detecting layer 220 are controlled to be implemented in the keyboard mode M1 (operating the tactile member 210 provided to the contact sensing layer 220 and activating the first touch panel 221) and the input member mode M2 (activating the second touch panel 222, it will be described in detail when the input member mode M2 is described).

FIG. 11 is a view illustrating an operation state of a tactile member 210, a contact sensing layer and an electronic paper 240 according to an input mode of the input device in the device shown in FIG. 1. Referring to FIG. 11, in an embodiment of the present disclosure, the input device 200 may be converted into two input modes, particularly the keyboard mode M1 and the input member mode M2.

That is, when the input device 200 is connected to the portable terminal 100, the input can be implemented in two modes including the keyboard mode M1 and the input member mode M2.

In the case of the keyboard mode M1, the tactile member 210 operates and rises to the positions of the input keys 201 so that the first touch panel 221 is activated. Further, the second touch panel 222 is deactivated because the input of the input member 140 is not allowed to be implemented. In the keyboard mode M1, therefore, when a user pushes the touch panel corresponding to the input keys 201, it is possible to provide tactility of pushing a physical key to the user and to implement the input by an input signal of the first touch panel corresponding to the input key 201 which the user contacts.

In the case of the input member mode M2, the second touch panel 222 is activated, while the tactile member 210 or the first touch panel 221 is deactivated. That is, the second touch panel 222 which detects a contact or proximity of the input member 140 is activated in order to implement the input through the input member 140 such as the electronic pen.

In the present disclosure, three embodiments in which an input mode is converted into the keyboard mode M1 or the input member mode M2 will be described (see FIG. 1). In the first embodiment, the input mode may be converted into the keyboard mode M1 or the input member mode M2 according to the attachment or detachment of the input member 140 (see I in FIG. 1). In the second embodiment, the switch unit 250 to set an activation or deactivation of the first touch panel 221 or the second touch panel 222 is provided to the input device 200, and the input mode is converted in the keyboard mode M1 or the input member mode M2 according to a turning on or off of the switch unit 250 (see II of FIG. 1). In the third embodiment, the input device 200 is provided with a proximity sensor 260 for sensing a contact of an object such as a hand with the input device 200, and a sensing unit 150 for sensing the attachment or detachment of the input member 140, and the input mode is converted into the keyboard mode M1 and the input member mode M2 according to a signal applied to the proximity sensor 260 and the sensing unit 150 (see III of FIG. 1).

The conversion of the input mode in the input device 200 according to the first embodiment will be described. The conversion of the input mode in the input device 200 according to the first embodiment, particularly into the keyboard mode M1 or the input member mode M2 is implemented through the attachment or detachment of the input member 140. Particularly, according to an embodiment of the present disclosure, the portable terminal 100 includes the input member 140, the mounting portion 111, the sensing unit 150, and the controller 170 in order to convert the input mode of the input device 200. That is, the input mode of the input device 200 is converted into the keyboard mode M1 or the input member mode M2 by means of the configurations. In other words, if it is detected that the input member 140 is inserted in the mounting portion 111, the controller 170 converts the input device 200 in the keyboard mode M1, while if it is detected that the input member 140 is separated from the mounting portion 111, the controller 170 converts the input device 200 into the input member mode M2.

Particularly, the case that the input device 200 is implemented in the keyboard mode M1 will be described. When the input member 140 is inserted in the mounting portion 111, the switch is pressed and turned on. A signal indicating that the switch is turned on is applied to the controller 170, and the controller 170 controls the input device 200 to be implemented in the keyboard mode M1, according to the value of the signal. That is, the controller 170 controls to operate the tactile member 210 and to activate the first touch panel 221. On the other hand, the controller 170 controls to deactivate the second touch panel 222 contacting the input member 140. As the tactile member 210 operates, the flat tactile plate 212 is raised at portions thereof corresponding to the input keys 201. When a user touches the raised tactile plate 212, the first touch panel 221 of the touched input key 201 senses an input and implements an output corresponding to the input. In the state of the input device 200 in the keyboard mode M1, accordingly, the tactile member 210 is raised, the first touch panel 221 is activated, the second touch panel 222 is deactivated, and the electronic paper is activated.

Hereinafter, the case that the input device 200 is implemented in the input member mode M2 will be described. When the input member 140 is withdrawn from the mounting portion 111, the pressed switch is turned off and an off signal is applied to the controller 170. The controller 170 controls the input device 200 to be implemented in the input member mode M2 according to a sensed value of the input member 140 applied to the controller 170. That is, the controller 170 controls to activate the second touch panel 222 for sensing a touch of the input member 140, not to operate the tactile member 210, and to deactivate the first touch panel 221 and the display layer 230. Therefore, the tactile plate 212 is maintained in a flat state because the tactile member 210 does not operate, and the first touch panel 221 cannot sense a touch of an object such as a hand, which has an electric charge, as the first touch panel 221 is deactivated. Further, as the display layer 230 is deactivated, a user can implement an input on the input device 200 by means of the input member 140. Accordingly, when the user makes the input member 140 contact the input device 200 so as to draw diagrams or to input characters, the activated second touch panel 222 senses the input of the input member 140 and implements an output according to the input.

The conversion of the input mode in the input device 200 according to the second embodiment will be described. The conversion of the input mode in the input device 200 according to the second embodiment, particularly into the keyboard mode M1 or the input member mode M2 is implemented by the switch unit 250 provided to the input device 200. Particularly, the input device 200 includes the switch unit 250 and the controller 170 in order to convert the input mode of the input device 200 according to an embodiment of the present disclosure. That is, as the switch unit 250 provided to the input device 200 is turned on or off, the input mode of the input device 200 is converted into the keyboard mode M1 or the input member M2. Particularly, the switch unit 250 is provided to the input device 200. The switch unit 250 is provided to the input device 200, particularly to a portion around position at which the input keys 201 are arranged, or to sides of the housing 211, in the form of on/off buttons. In the present disclosure, the switch unit 250 which is arranged on a right upper portion of the input device 200 will be described as an example. However, the position of the switch portion 250 is not limited to the above description. For example, the switch unit 250 may be along the side of the housing 211, and may be changed in the arrangement position without limit in consideration of convenience, design and the like because the switch unit 250 can be arranged at any position on a peripheral of the housing 211. As a user turns on and off the switch unit 250, the first touch panel 221 and the second touch panel 222 are selectively activated. The controller 170 controls to operate the tactile member 210 as the user turns on/off the switch unit 250, and determines whether to control the activation of the first touch panel 221 or the second touch panel 222.

Firstly, the case that the input device 200 is implemented, particularly, in the keyboard mode M1 will be described. When the switch unit 250 provided to the input device 200 is pressed to be turned on, a signal indicating that the switch unit 250 is turned on is applied to the controller 170. The controller 170 controls the input device 200 to be implemented in the keyboard mode M1 according to a sensed value applied to the controller 170. That is, the controller 170 controls to operate the tactile member 210 and to activate the first touch panel 221. On the other hand, the controller 170 controls to deactivate the second touch panel 222 contacting the input member 140. As the tactile member 210 operates, the flat tactile plate 212 is raised at portions thereof corresponding to the input keys 201. When a user touches the raised tactile plate 212, the first touch panel 221 of the touched input key 201 senses an input and implements an output corresponding to the input. In the state of the input device 200 in the keyboard mode M1, accordingly, the tactile member 210 is raised, the first touch panel 221 is activated, the second touch panel 222 is deactivated, and the electronic paper is activated.

Hereinafter, the case that the input device 200 is implemented in the input member mode M2 will be described. When a user turns off the switch unit 250, an off signal is applied to the controller 170. The controller 170 controls the input device 200 to be implemented in the input member mode M2 according to the off signal of the switch unit 250 applied to the controller 170. That is, the controller 170 controls to activate the second touch panel 222 for sensing a contact of the input member 140, not to operate the tactile member 210, and to deactivate the first touch panel 221 and the display layer 230. Therefore, the tactile plate 212 is maintained in a flat state because the tactile member 210 does not operate, and the first touch panel 221 cannot sense a contact of an object such as a hand, which has an electric charge, as the first touch panel 221 is deactivated. Further, as the display layer 230 is deactivated, a user can implement an input on the input device 200 by means of the input member 140. Accordingly, when the user makes the input member 140 contact the input device 200 so as to draw diagrams or to input characters, the activated second touch panel 222 senses the input of the input member 140 and implements an output according to the input.

The conversion of the input mode in the input device 200 according to the third embodiment will be described. The conversion of the input mode in the input device 200 according to the third embodiment, particularly into the keyboard mode M1 or the input member mode M2, is implemented through the attachment or detachment of the input member 140. In an embodiment of the present disclosure, the input device 200 includes the proximity sensor 260, the sensing unit 150, and the controller 170.

The proximity sensor 260 is provided to a lower end of the input device 200, so as to sense approach of an object, particularly approach of a hand to the input device 200. The sensing unit 150 has an identical structure to the sensing unit 150 described with relation to the input device 200 according to the first embodiment, and the previous description of the sensing unit 150 according to the first embodiment will be applied correspondingly to the sensing unit 150 in this embodiment. As described above, the controller 170 controls to operate the input device 200, to operate the tactile member 210, and to activate either the first touch panel 221 or the second touch panel 222. The conversion of the input mode in the input device 200 as described above will be described.

Firstly, the case that the input device 200 is implemented, particularly, in the keyboard mode M1 will be described. When a proximity sensor 260 provided to a lower portion of the input device 200 senses approach of an object, particularly approach of a hand of a user, a signal sensed by the proximity sensor 260 is applied to the controller 170. Further, the sensing unit 150 senses a signal indicating a state that the input member 140 is mounted. Accordingly, the controller 170 controls to implement the input device 200 in the keyboard mode M1 by using sensed values applied to the controller 170, i.e. a sensed value of the proximity sensor 260 and a sensed value of the sensing unit 150. The controller 170 controls to operate the tactile member 210 and to activate the first touch panel 221. On the other hand, the controller 170 controls to deactivate the second touch panel 222 contacting the input member 140. As the tactile member 210 operates, the flat tactile plate 212 is raised at portions thereof corresponding to the input keys 201. When a user touches the raised tactile plate 212, the first touch panel 221 of the touched input key 201 senses an input and implements an output corresponding to the input. In the state of the input device 200 in the keyboard mode M1, accordingly, the tactile member 210 is raised, the first touch panel 221 is activated, the second touch panel 222 is deactivated, and the electronic paper is activated.

Hereinafter, the case that the input device 200 is implemented in the input member mode M2 will be described. Although a proximity sensor 260 provided to a lower portion of the input device 200 senses a contact of an object, the controller 170 controls to implement the input device 200 in an input mode when the sensing unit 150 senses that the input member 140 is in a separate state. That is, the controller 170 controls to activate the second touch panel 222 for sensing a contact of the input member 140, not to operate the tactile member 210, and to deactivate the first touch panel 221 and the display layer 230. Therefore, the tactile plate 212 is maintained in a flat state because the tactile member 210 does not operate, and the first touch panel 221 cannot sense a contact of an object such as a hand, which has an electric charge, as the first touch panel 221 is deactivated. Further, as the display layer 230 is deactivated, a user can implement an input on the input device 200 by means of the input member 140. Accordingly, when the user makes the input member 140 contact the input device 200 so as to draw diagrams or to input characters, the activated second touch panel 222 senses the input of the input member 140 and implements an output according to the input.

An operation of the input device 200 in the device 10 including the portable terminal 100 and the input device 200, constructed as described above, will be described.

Figure 12:
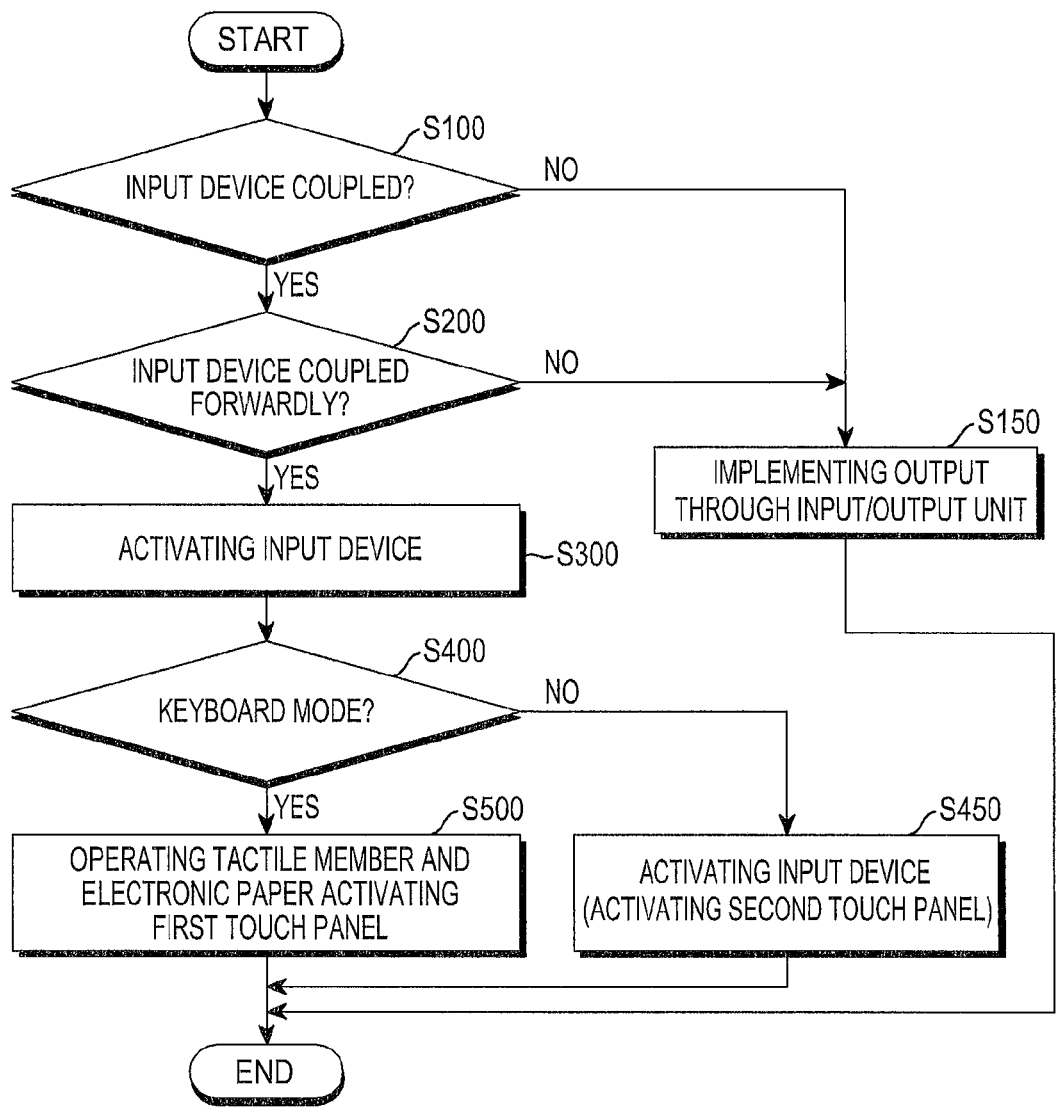
FIGS. 12 and 13 are flowcharts illustrating operation processes of the input device of the device shown in FIG. 1.
Figure 13:
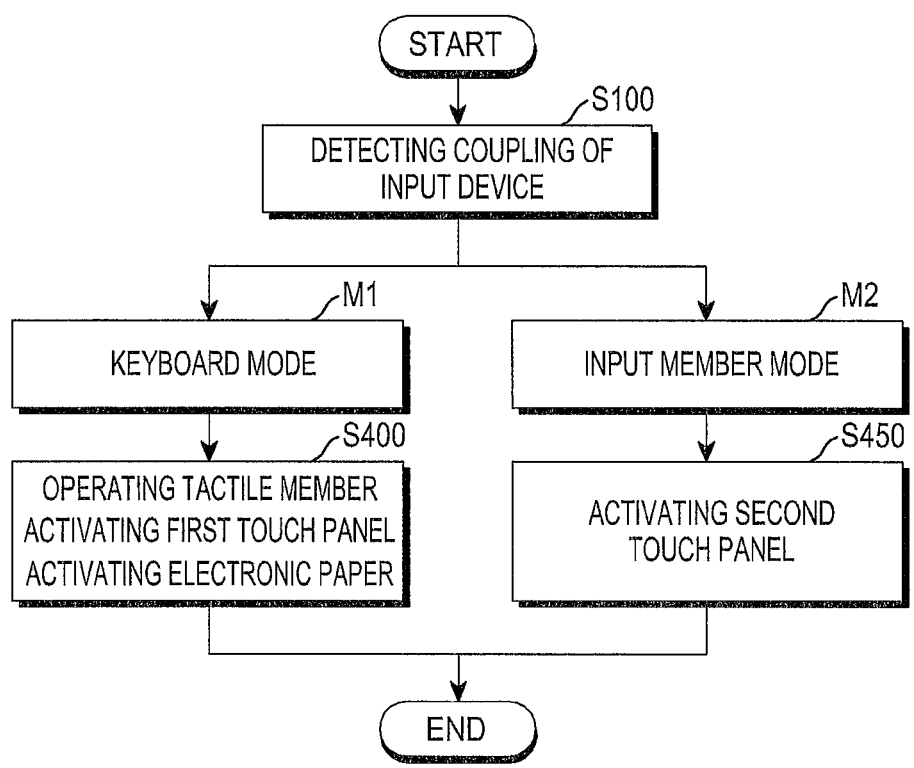

FIGS. 12 and 13 are flowcharts illustrating operation processes of the input device of the device shown in FIG. 1. Referring to FIGS. 12 and 13, as a signal value is applied to the controller 170 according to a connection or a disconnection of the body of the portable terminal 100 to the input device 200, the controller controls whether the input device 200 is operated, and whether an input and output is implemented through the input/output unit 120 of the body 110, in step S100. In the case that the body 110 is not coupled to the input device 200, the controller controls to operate the original input/output unit 120 of the terminal 100. That is, the controller 170 controls the terminal 100 to implement an output through the display panel 121, and an input through the touch screen 122, in step S150.

However, when the body 110 is cradled on and electrically coupled to the input device 200, the controller 170 controls to implement an input to the portable terminal 100 through the input device 200 by using a signal value with relation to the electric connection. On the other hand, according to whether the portable terminal 100 is forwardly or reversely connected to the input device 200, the input mode of the portable terminal may be changed in step S200. That is, as described above, in the case that the portable terminal is forwardly cradled, the input device 200 is activated, and the touch screen 122 is deactivated in the state that the input/output unit 120, particularly the display panel 121, is turned on.

To the contrary, in the case that the portable terminal is reversely cradled on the input device 200, the input device 200 is deactivated, and the input/output unit 120 is activated, so as to implement a user's setting mode in the state that the portable terminal is reversely cradled in step S150.

In the case that the portable terminal is forwardly cradled on the input device 200, as described above, the input device 200 is activated, the display panel is turned on, and the touch screen 122 is deactivated.

As described above, according to the setting of the input mode of the input device 200 in the three embodiments, it is determined that the input device 200 is in the keyboard mode M1 or in the input member mode M2, in step S400.

In the case that the input device 200 is implemented in the keyboard mode M1, the tactile member 210 of the input device 200 operates, the first touch panel 221 is activated, and the display layer 230, particularly electronic paper, operates. Further, the body 110 is implemented so that only the display panel 121 is turned on, and the touch screen 122 is turned off. Accordingly, the input keys 201 with a pattern of QWERTY keys are raised, and a user presses the raised input keys 201, thereby implementing inputs to the body 110, in step S500.

Furthermore, in the case that the input device 200 is implemented in the input member mode M2 in step S450, the second touch panel 222 is activated, and the body 110 is operated so that the display panel is turned on. As the input member 140 contacts an upper surface of the flat input device 200, accordingly, the second touch panel 222 senses the contact and the sensed input value is displayed on the display panel.

The input device and the portable terminal having the same according to the various embodiments of the present disclosure have an advantage in that the inputs can be implemented through the input member such as an electronic pen provided to the portable terminal or the input device, as well as through the input keys of the portable terminal in the state that the portable terminal is cradled on the input device.

Moreover, they have another advantage in that convenience in use of the input device can be improved because the input device is converted to an input mode using a keyboard or to an input mode using an input member according to a desired mode of a user.

In addition, they have still another advantage in that an unnecessary metal material, which is provided in order to balance a weight between the portable terminal and the input device when the portable terminal is cradled on the input device, can be removed thereby reducing a cost of the material.

Although the exemplary embodiments of the present disclosure are described, it will be understood that various changes can be implemented without departing from the scope of the present disclosure. For example, although the conversion of the input device into the keyboard mode M1 or the input member mode M2 is described with respect to the three embodiments in the present disclosure, it can be changed without limit according to the setting. In other words, the conversion of the input mode of the input device 200 can be variously changed without limit in such a manner that the input mode of the input device 200 is set by using a specific application provided to the body 110.

Although the conversion of the setting mode according to a direction that the portable terminal 100 is cradled on the input device 200 is described with respect to the embodiments, it will be obvious that the setting mode can be changed by a user's setting without limit.

Further, a position of the switch unit 250 or a position of the proximity sensor 260 described above may be changed without limit according to the form of the input device 200.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An input device, comprising:
 a tactile member including a plurality of input keys having variable positions; and
 a contact sensing layer operably connected to a portion of the tactile member and configured to detect an input operation through the tactile member, the contact sensing layer comprising a first touch panel of a first touch sensing type and a second touch panel of a second touch sensing type;

wherein the input device is configured to be operated in one of a first mode or a second mode according to a setting of an input mode, and wherein, in a first mode, the tactile member and the first touch panel are activated and the second touch panel is deactivated, and in the second mode, the tactile member and the first touch panel are deactivated and the second touch panel is activated.

2. The input device as claimed in claim 1, further comprising a display layer positioned in association with the tactile member and the contact sensing layer and configured to display a signal value assigned to one of the input keys.

3. The input device as claimed in claim 2, wherein the display layer comprises an electronic paper.

4. The input device as claimed in claim 1, wherein:
the first touch panel is configured to sense a contact of an object having an electric charge; and
the second touch panel is associated with a separate input member and is configured to sense a contact of the input member.

5. The input device as claimed in claim 4, wherein the first touch panel comprises an electrostatic capacitive typed touch panel of the first touch sensing type, and the second touch panel comprises an Electro-Magnetic Resonance (EMR) typed touch panel of the second touch sensing type.

6. The input device as claimed in claim 4, wherein the second touch panel is configured to be activated when the tactile member is maintained in a plane state, and the first touch screen is configured to be activated when portions of the tactile member corresponding to the input keys are raised.

7. The input device as claimed in claim 4, wherein the input device includes a keyboard mode and an input member mode.

8. The input device as claimed in claim 7, wherein:
in the keyboard mode, the input keys of the tactile member are raised, and the first touch panel is activated, and
in the input mode, the second touch panel is activated.

9. The input device as claimed in claim 4, further comprising:
a mounting portion in which the input member is detachably insertable;
a sensing unit configured to detect whether the input member is inserted in the mounting portion; and
a controller configured to control to operate the tactile member, the first touch panel, and the second touch panel according to detection by the sensing unit.

10. The input device as claimed in claim 9, wherein:
in response to detecting that the input member is inserted in the mounting portion, the controller is configured to activate the tactile member and the first touch panel, deactivate the second touch panel, and convert the input device into the first mode, and
in response to detecting that the input member is separated from the mounting portion, the controller is configured to deactivate the tactile member and the first touch panel, activate the second touch panel, and convert the input device into the second mode.

11. The input device as claimed in claim 4, further comprising:

a switch unit configured to selectively activate the first touch panel and the second touch panel; and
a controller configured to control to operate the tactile member, the first touch panel, and the second touch panel according to an on/off state of the switch unit.

12. The input device as claimed in claim 11, wherein:
when the switch unit is on, the controller is configured to activate the tactile member and the first touch panel, deactivate the second touch panel, and convert the input device into the first mode, and
when the switch unit is off, the controller is configured to deactivate the tactile member and the first touch panel, activate the second touch panel, and convert the input device into the second mode.

13. The input device as claimed in claim 4, further comprising:
a proximity sensor;
a sensing unit configured to detect an attachment and a detachment of the input member; and
a controller configured to control to activate the tactile member and the first and second touch panels according to signals detected by the proximity sensor and the sensing unit.

14. The input device as claimed in claim 13, wherein the controller configured to activate the tactile member and the first touch panel into the first mode in response to detection of approach of an object by the proximity sensor, and activate the second touch panel into the second mode in response to the sensing unit detecting that the input member is separated.

15. The input device as claimed in claim 1, further comprising: an operation unit configured to operate the tactile member.

16. The input device as claimed in claim 15, wherein the operation unit comprises:
a housing;
a fluid contained in the housing; and
an operation member configured to introduce the fluid into the tactile member,
wherein portions corresponding to the input keys are raised as the operation member operates.

17. A portable terminal, comprising:
a body including an input/output unit;
an input unit detachably connected to the body and configured to implement an input to the body; and
a controller configured to control an operation of the input/output unit and the input device,
wherein the input device comprises:
a tactile member including a plurality of input keys having variable positions; and
a contact sensing layer operably connected to a portion of the tactile member and configured to an input operation through the tactile member, the contact sensing layer comprising a first touch panel of a first touch sensing type and a second touch panel of a second touch sensing type; and
wherein the input device is configured to be operated in one of a first mode or a second mode according to a setting of an input mode, and
wherein, in a first mode, the tactile member and the first touch panel are activated and the second touch panel is deactivated, and
in the second mode, the tactile member and the first touch panel are deactivated and the second touch panel is activated.

18. The portable terminal as claimed in claim 17, wherein the tactile member comprises:

a tactile plate provided at an upper side of the input device, and is disposed to be variable at positions of the input keys; and an operation unit configured to varies the tactile plate.

19. The portable terminal as claimed in claim 17, wherein:

the first touch panel configured is to sense a contact of an object having an electric charge; and the second touch panel is associated with an input member so as to detect a contact of the input member.

20. The portable terminal as claimed in claim 19, wherein when the body is coupled to the input device, the controller is configured to control to implement an input through the input device.

21. The portable terminal as claimed in claim 20, wherein:

in the first mode, the tactile member is configured to operate, and the first touch is activated, and in the second mode, the second touch panel is activated.

22. The portable terminal as claimed in claim 21, wherein the input member is configured to implement an input on the input/output unit or the input device is detachably inserted in the body.

23. The portable terminal as claimed in claim 22, wherein when the input member is separated from the body, the input device is converted into the second mode.

24. The portable terminal as claimed in claim 22, wherein the input device further comprises a proximity sensor configured to detect approach of the object, and is converted into the first mode in response to detection of the approach of the object by the proximity sensor, and when the input member is separated from the body, the input device is converted into the second mode.

25. The portable terminal of claim 21, wherein the input device comprises a switch unit configured to convert the first mode and the second mode.

* * * * *